United States Patent [19]

Morgenstern et al.

[11] Patent Number: 5,214,673
[45] Date of Patent: May 25, 1993

[54] DIGITAL CROSS CONNECT ASSEMBLY

[75] Inventors: Todd A. Morgenstern, Golden Valley; Dennis M. Burroughs, Savage, both of Minn.

[73] Assignee: ADC Telecommunications, Inc., Minneapolis, Minn.

[21] Appl. No.: 814,212

[22] Filed: Dec. 19, 1991

Related U.S. Application Data

[63] Continuation of Ser. No. 389,804, Aug. 4, 1989, abandoned.

[51] Int. Cl.⁵ .................... H04L 25/00; H05K 5/00; H05K 5/4; H05K 5/06
[52] U.S. Cl. .................................. 375/36; 361/394; 439/53
[58] Field of Search ............ 375/36; 379/29, 325–329; 360/131; 361/392, 394; 364/708, 709, 540, 668, 752; 439/43–49, 53, 752, 540, 668, 60

[56] References Cited

U.S. PATENT DOCUMENTS

| | | | |
|---|---|---|---|
| 4,650,933 | 3/1987 | Beuda et al. | 439/60 X |
| 4,670,626 | 5/1987 | Fisher et al. | 370/58.2 X |
| 4,749,968 | 5/1988 | Burroughs | 333/124 X |
| 4,815,104 | 3/1988 | Williams et al. | 375/36 |
| 4,840,568 | 5/1989 | Burroughs et al. | 361/415 X |

*Primary Examiner*—Curtis Kuntz
*Assistant Examiner*—Tesfaldet Bocure
*Attorney, Agent, or Firm*—Merchant, Gould, Smith, Edell, Welter, Schmidt

[57] ABSTRACT

A modular digital signal cross-connect assembly is disclosed having housing and a plurality of coax digital signal cross-connect modules. Each of the modules has a frame that is slidably received within the housing. Each frame carries coax DSX circuitry, including a plurality of jacks on a forward wall of the module. Rear walls of the module carry coax connectors which are slidably engageable with coax connectors mounted on the housing. The coax connectors are aligned for the housing and the frame connectors to mate as the frame is slid into the housing to an inserted position. In alternative embodiments, the modules include a monitor switch to permit monitoring of any one of a plurality of circuit path in said modules.

23 Claims, 14 Drawing Sheets

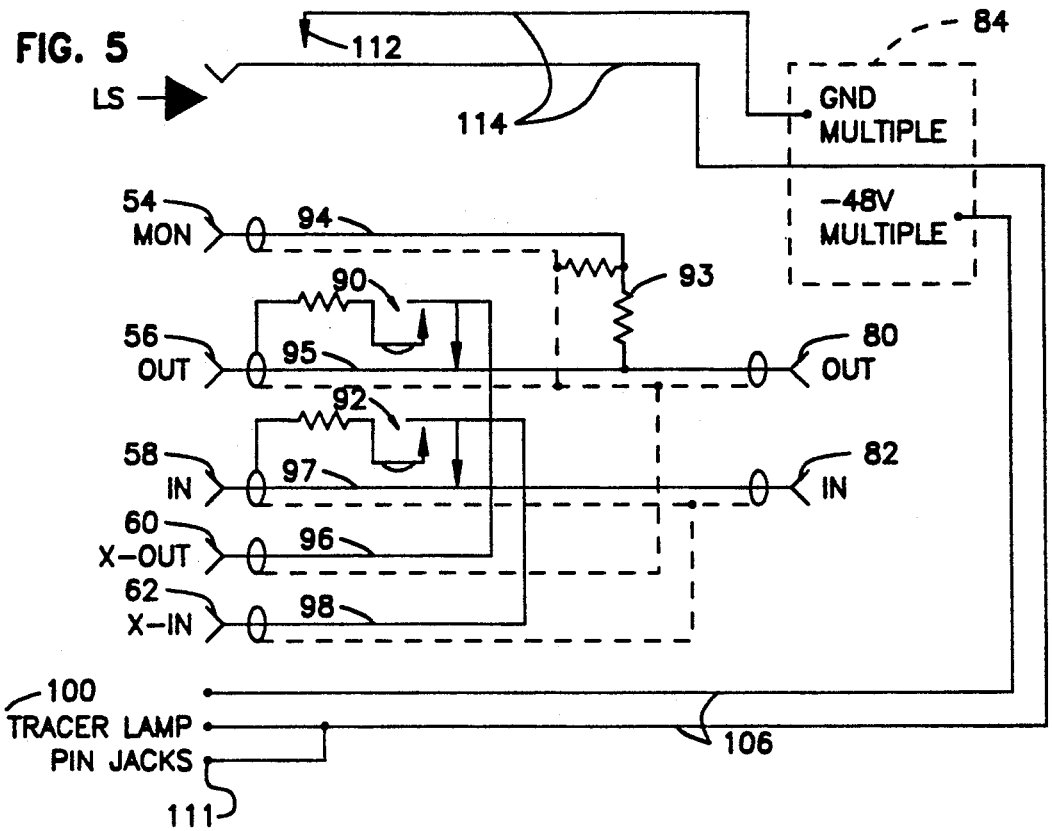

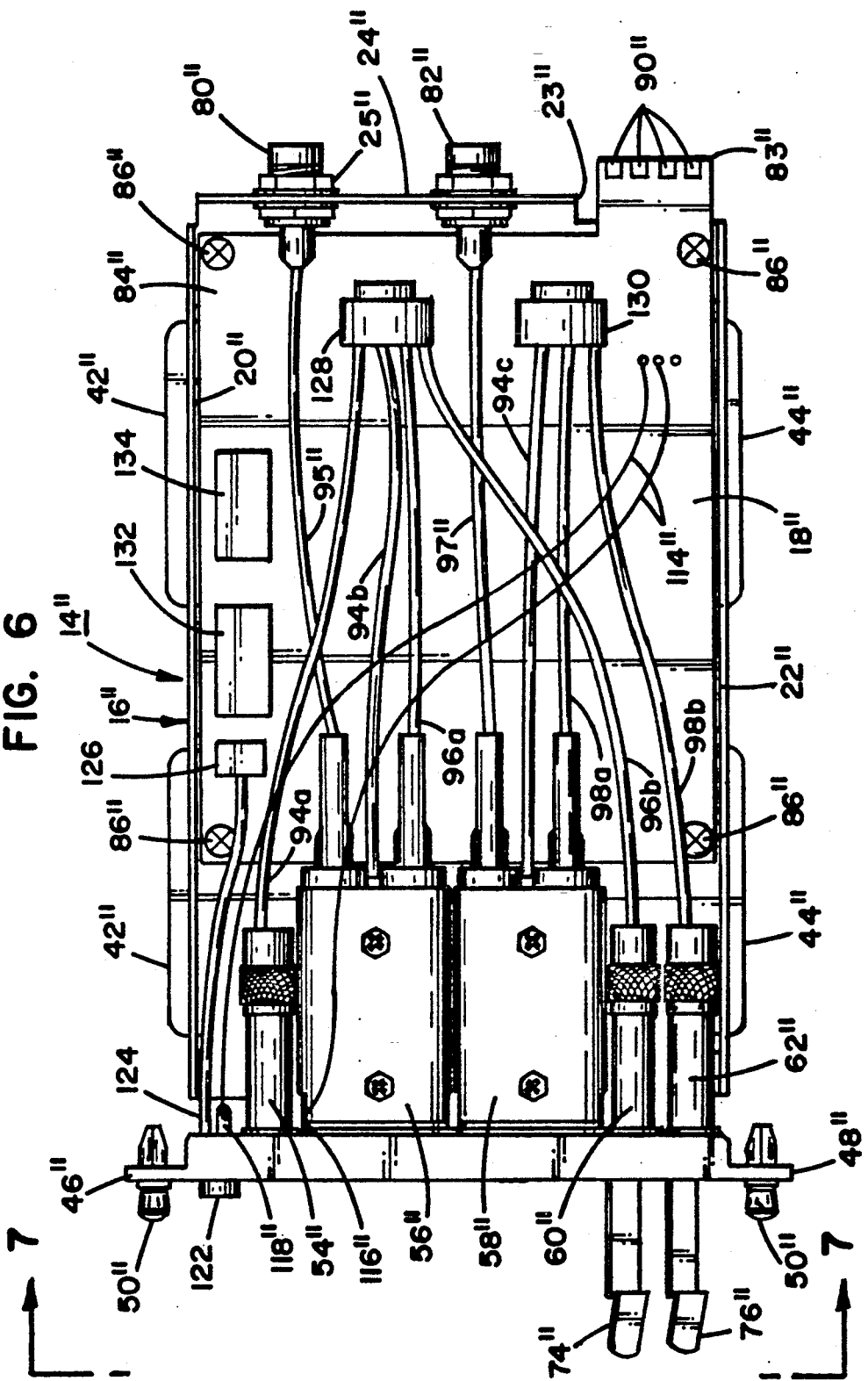

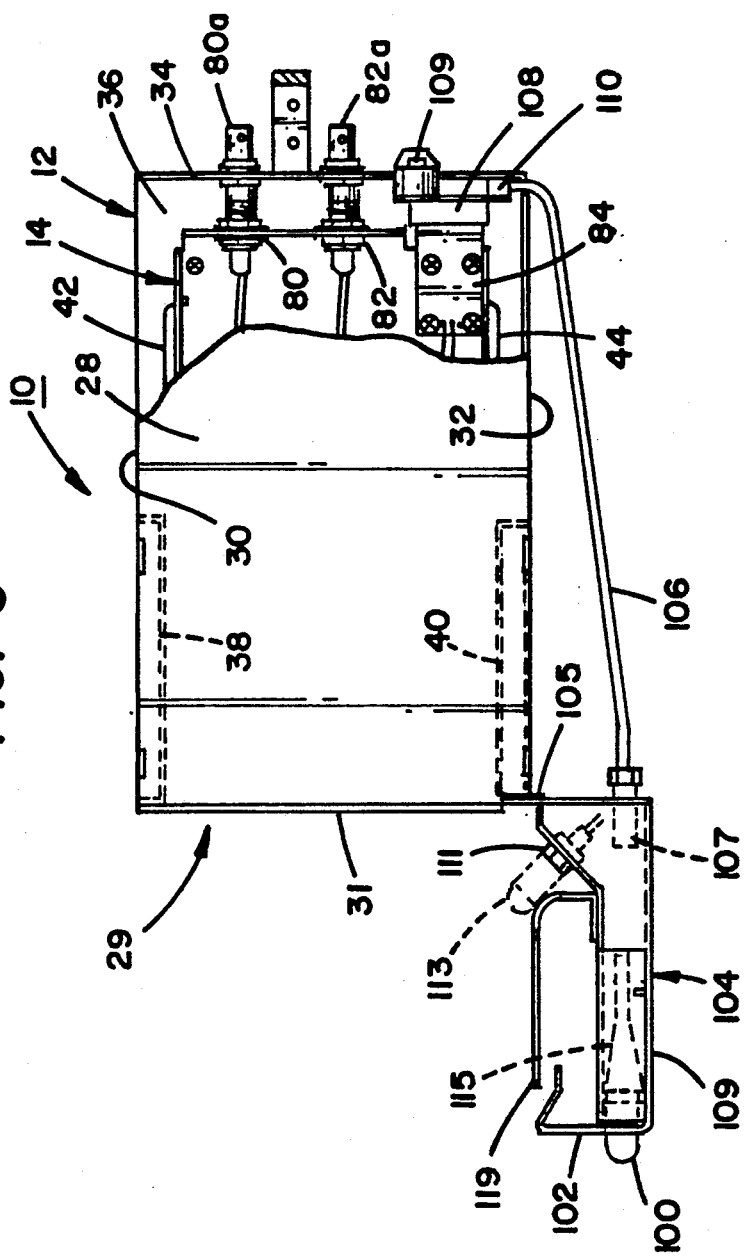
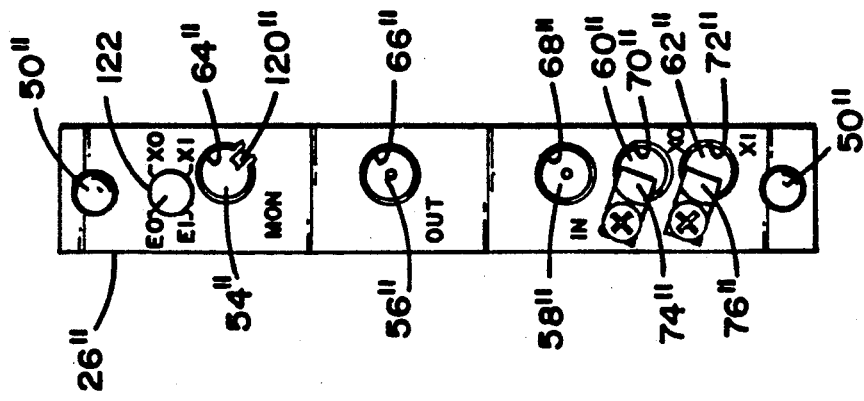

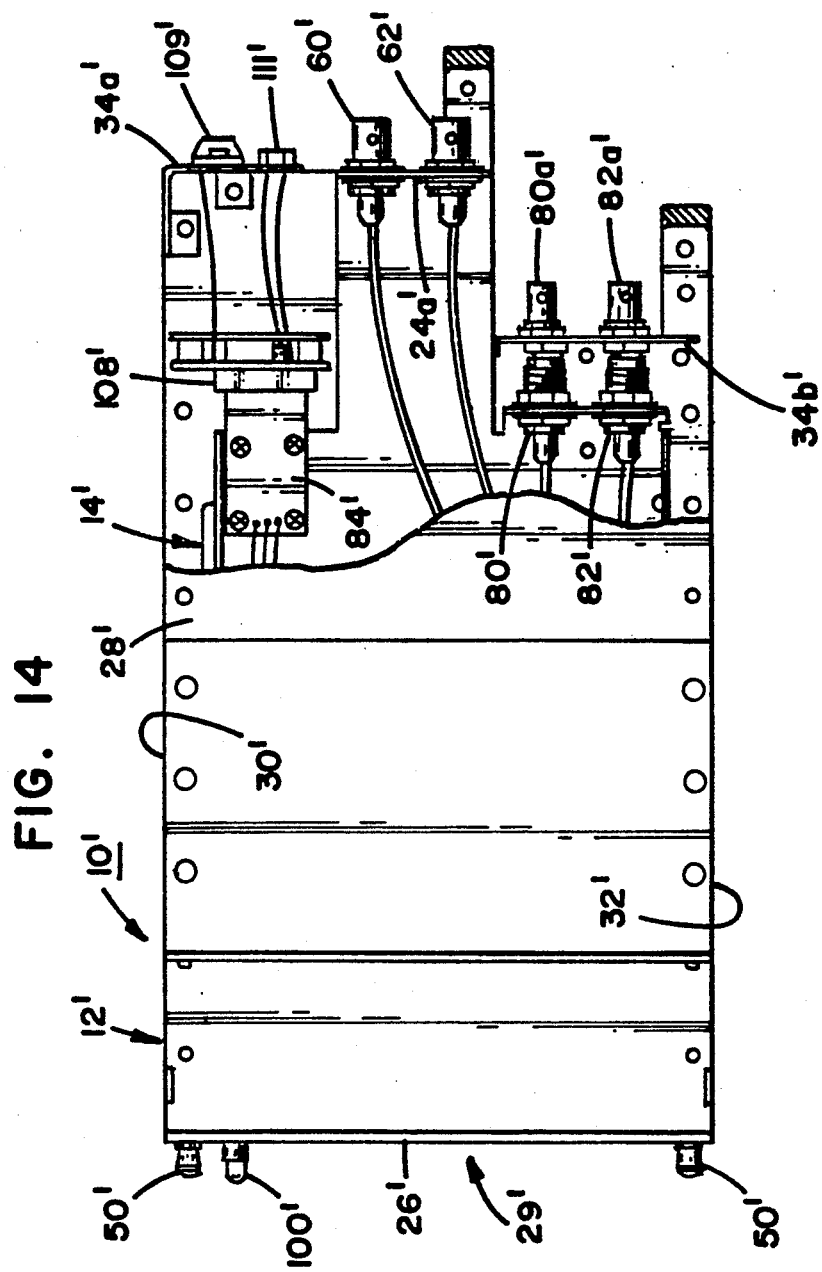
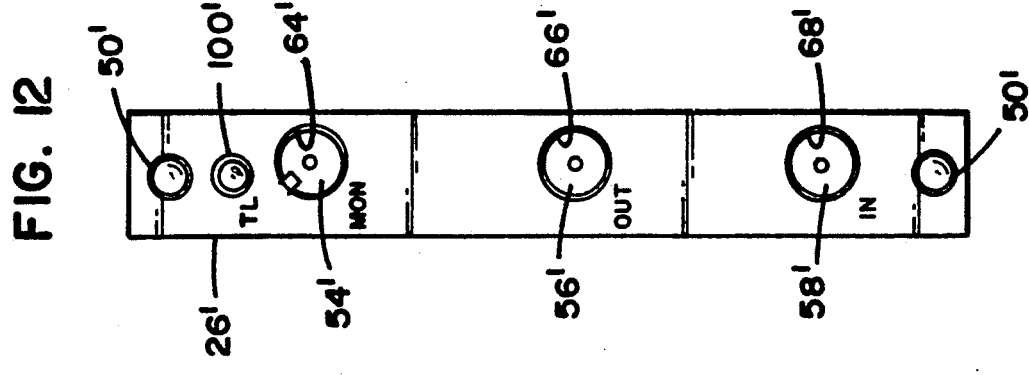

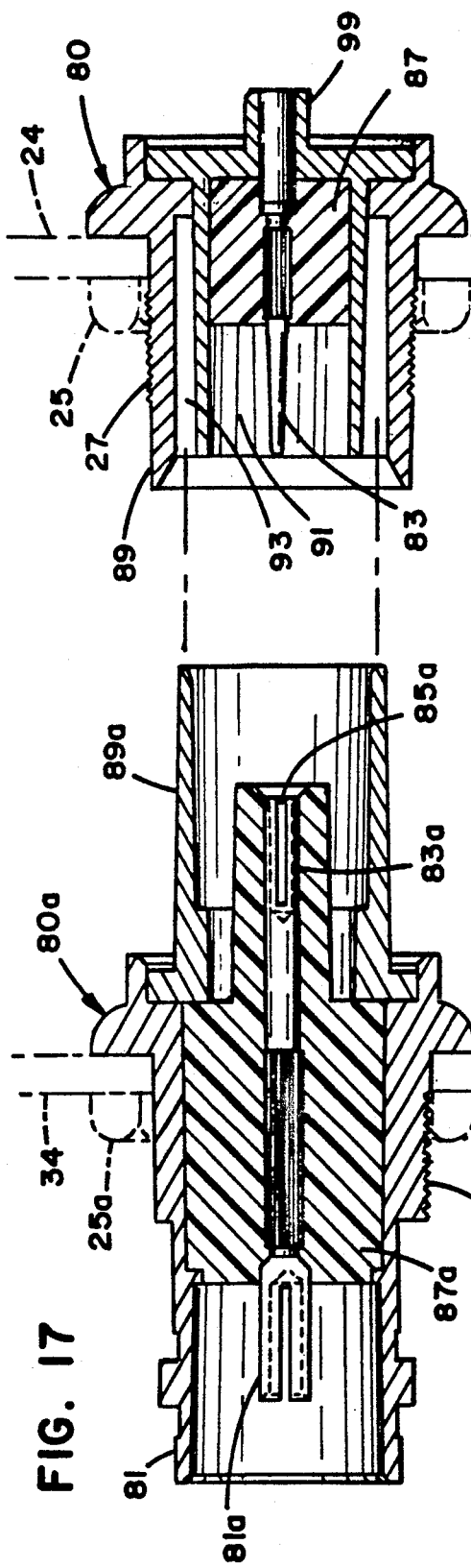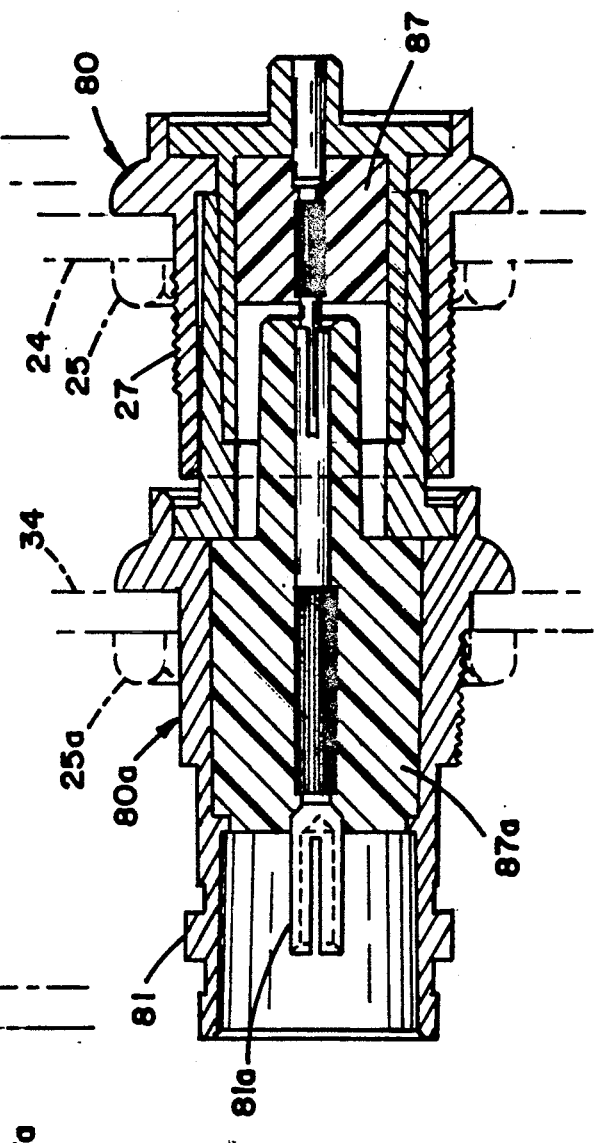
FIG. 17
FIG. 18

DIGITAL CROSS CONNECT ASSEMBLY

This is a continuation of application Ser. No. 07/389,804, filed Aug. 4, 1989, now abandoned.

I. BACKGROUND OF THE INVENTION

1. Field of the Invention

This invention pertains to a modular digital signal cross-connect (DSX) assembly. More particularly, this invention pertains to a modular DSX assembly for high speed transmission signals carried over coaxial cables. This invention also pertains to DSX assemblies with switching monitor jacks.

2. Background of the Prior Art

Digital signal cross-connect systems (DSX) provide a location for interconnecting two digital transmission paths. The apparatus for a DSX is located in one or more frames, or bays, usually in a telephone central office. The DSX apparatus also provides jack access to the transmission path.

DSX jacks are well-known. A modular DSX jack assembly is described and claimed in commonly assigned U.S. Pat. No. 4,840,568.

DSX equipment for use with high speed signals (such as telecommunication industry standards DS-3 and DS-4 transmission rates) include coaxial cables for carrying the signals. An example of such is described in U.S. Pat. No. 4,815,104, which includes switching coax jacks.

The circuitry of a different prior art coax DSX jack is shown in FIG. 2 of the aforesaid U.S. Pat. No. 4,815,104. As indicated, the circuitry includes a plurality of jacks (including signal-in and signal-out jacks) joined with connectors (e.g., equipment-in and equipment-out connectors) by coax cables. The circuitry also includes cross-connect points which may be forward facing jacks or rear facing connectors. One or more monitor jacks permit monitoring of a signal at preselected points in the circuit.

Prior art coax DSX jacks are semi-modular in that the cross-connect circuitry, jacks and related coax connectors for each circuit are housed in a unique jack frame such as that shown in FIG. 1 of the aforesaid U.S. Pat. No. 4,815,104. However, the modularity of the design is hampered in that such prior art jack assemblies are not easily mounted or dismounted from a prewired installation. Therefore, they do not enjoy the full benefits of the modularity of design of the aforesaid commonly assigned U.S. Pat. No. 4,840,568. Also, present coax DSX designs do not permit the addition of circuit enhancements (such as repeater circuits) to the DSX module. Such a function is a benefit described in the aforementioned U.S. Pat. No. 4,840,568.

It is an object of the present invention to provide a coax DSX module with enhanced modularity and which is adaptable to receive circuit enhancements. It is also an object of the present invention to provide a DSX jack with a monitor which can be switched to monitor any one of a plurality of signal paths in the DSX assembly.

II. SUMMARY OF THE INVENTION

According to a preferred embodiment of the present invention, a coax DSX assembly is described. The assembly includes a housing or chassis which carries a plurality of digital signal cross-connect modules. Each of the modules includes jacks on the forward face and connectors on the rear of the module. The jacks and connectors are connected by cross-connect circuitry including coaxial cables. The rear coax connectors include a pair of mating connectors which are releasably connectible and disconnectible by relative movement of the pair toward and away from one another along a predetermined axis of alignment.

An alternative embodiment of the invention includes a circuit board carried on the module with the coaxial cables connected to the circuit board and with circuit enhancement carried on the circuit board. A monitor selection switch permits an operator to monitor signals along any one of a plurality of circuit paths within the module.

III. BRIEF DESCRIPTION OF THE DRAWINGS

FIG. 5 is a schematic view of the circuitry of a DSX assembly having the module of FIG. 1;

FIG. 6 is a side elevation view of an alternative embodiment of the coax DSX module of the present invention showing a front cross-connect DSX with variable monitoring functions;

FIG. 7 is a view taken along line 7—7 of FIG. 6;

FIG. 8 is a side elevation view, shown partially in section, of a DSX assembly according to the present invention, with the DSX module of FIG. 1 contained within a DSX housing;

FIG. 12 is a view taken along line 12—12 of FIG. 11;

FIG. 13 is schematic representation of the circuitry of the module of FIG. 11;

FIG. 14 is a side elevation view, partially in section, showing a module of FIG. 11 installed within a DSX housing to form a completed DSX assembly;

FIG. 17 is a side elevation view, shown partially in section, of coax connector meeting elements of the present invention shown separated with the elements and axially aligned;

FIG. 18 is the view of FIG. 17 with the elements shown in a mating position;

IV. DESCRIPTION OF THE PREFERRED EMBODIMENT

A. First Preferred Embodiment

1. General Mechanical Structure

Referring now to the several drawing figures in which identical elements are numbered identically throughout, a description of a preferred embodiment of the invention will now be described.

The present invention is for a digital signal cross-connect assembly shown generally as item 10 in FIG. 8. The assembly 10 includes a chassis or housing 12 and a plurality of digital signal cross-connect (DSX) modules 14. Each of modules 14 is identical, and a description of one will suffice as a description of all modules 14.

Figure 1:
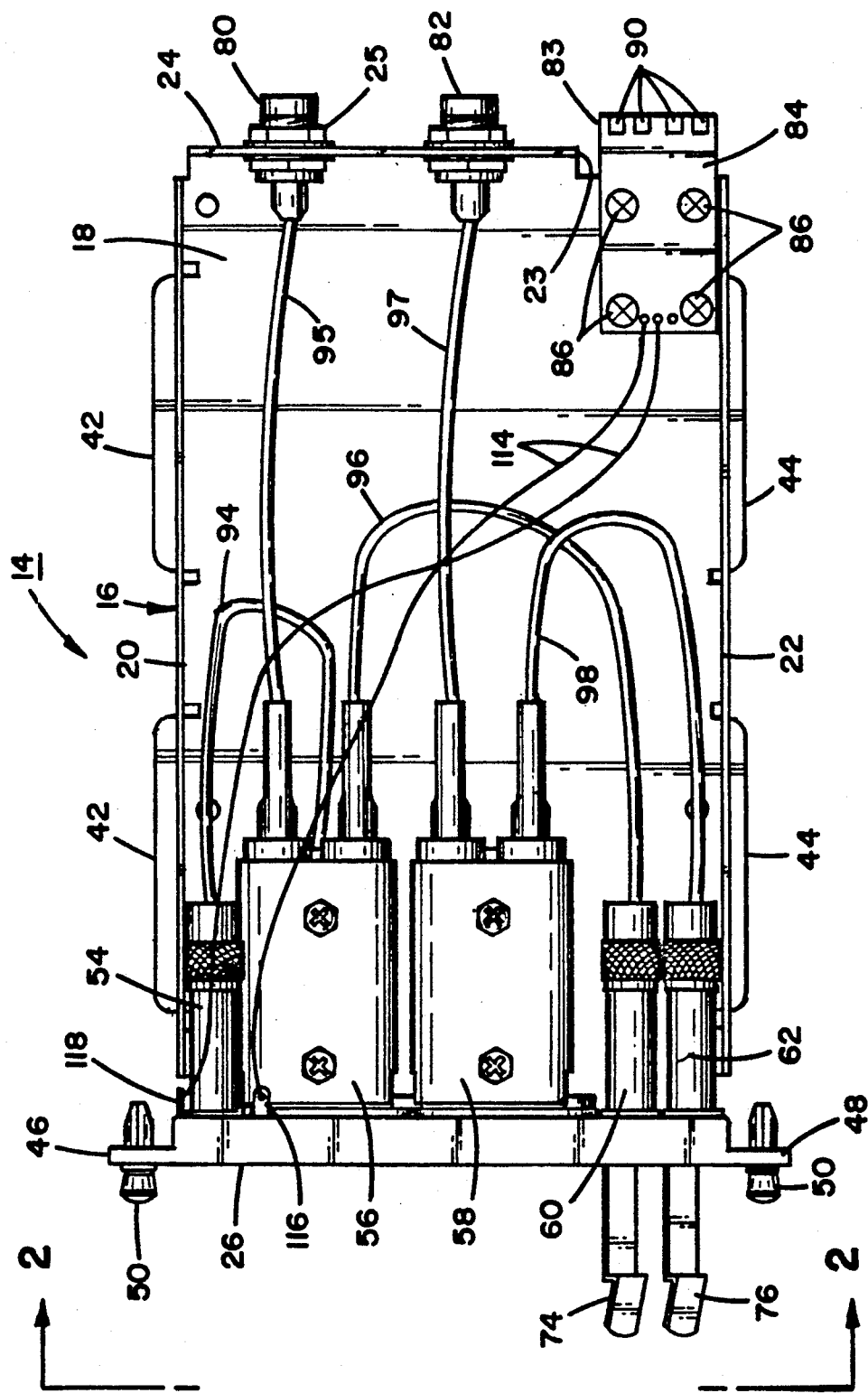
FIG. 1 is a side elevation view of a front cross-connect coax DSX module according to the present invention.
Figure 2:
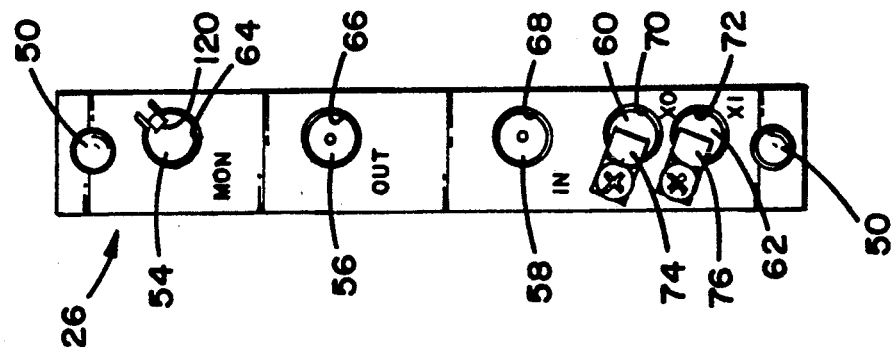
FIG. 2 is a view taken along line 2—2 of FIG. 1.

Shown best in FIGS. 1 and 2, each of modules 14 includes a frame 16 having a flat side plate 18. Preferably, side plate 18 is formed from sheet metal and includes integrally formed, perpendicular top plate 20 and bottom plate 22. Also perpendicular to side plate 18 is a rear plate 24 formed integrally with plate 18. Module 14 also includes a front cover plate 26. Plate 26 is not integral with plate 18, but instead is preferably molded plastic connected to plate 18 through any suitable means.

Figure 10:
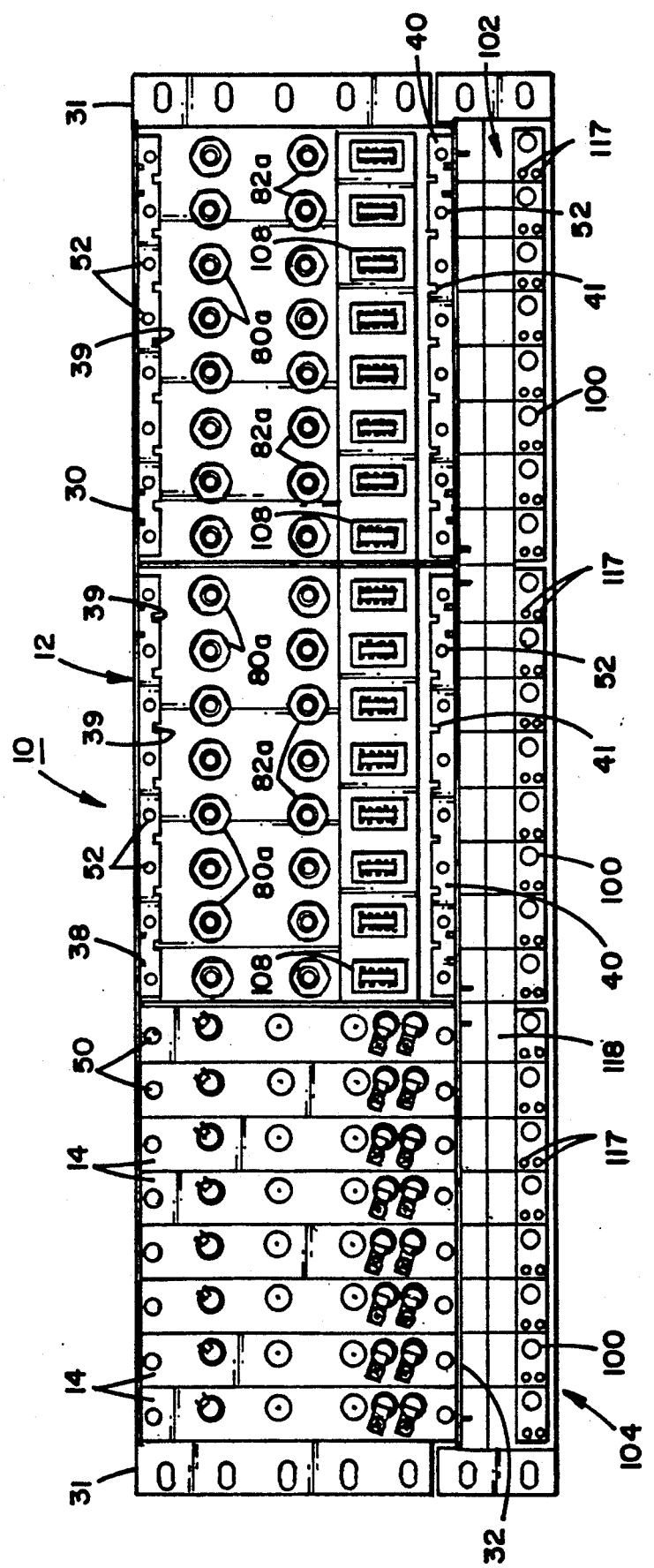
FIG. 10 is a front elevation view of the assembly of FIG. 8 with the modules of FIG. 1 installed within a portion of the housing in FIG. 9.
Figure 11:
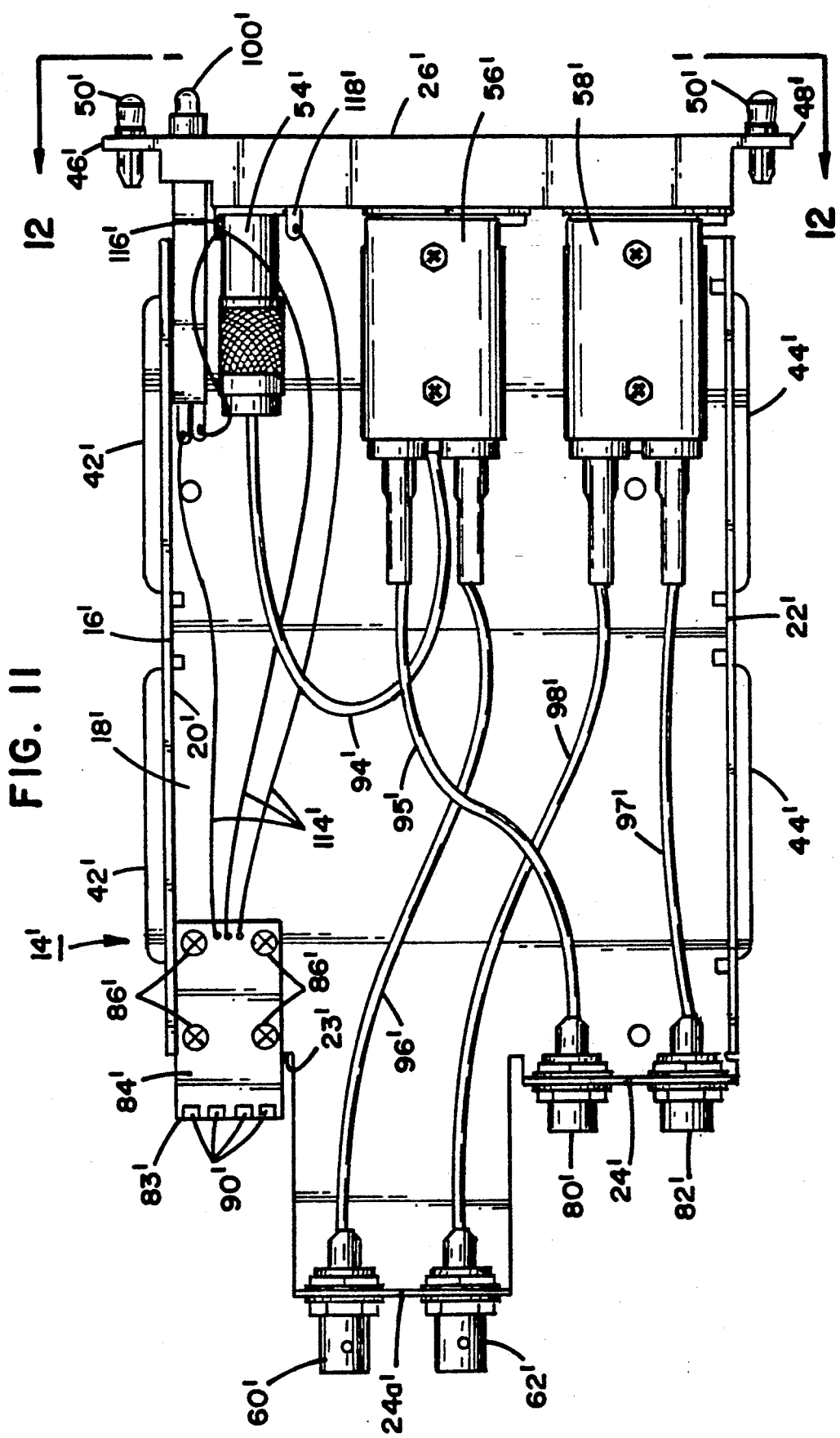
FIG. 11 is a side elevation view of an additional alternative embodiment of a DSX module according to the present invention showing a rear cross-connect DSX.
Figure 15:
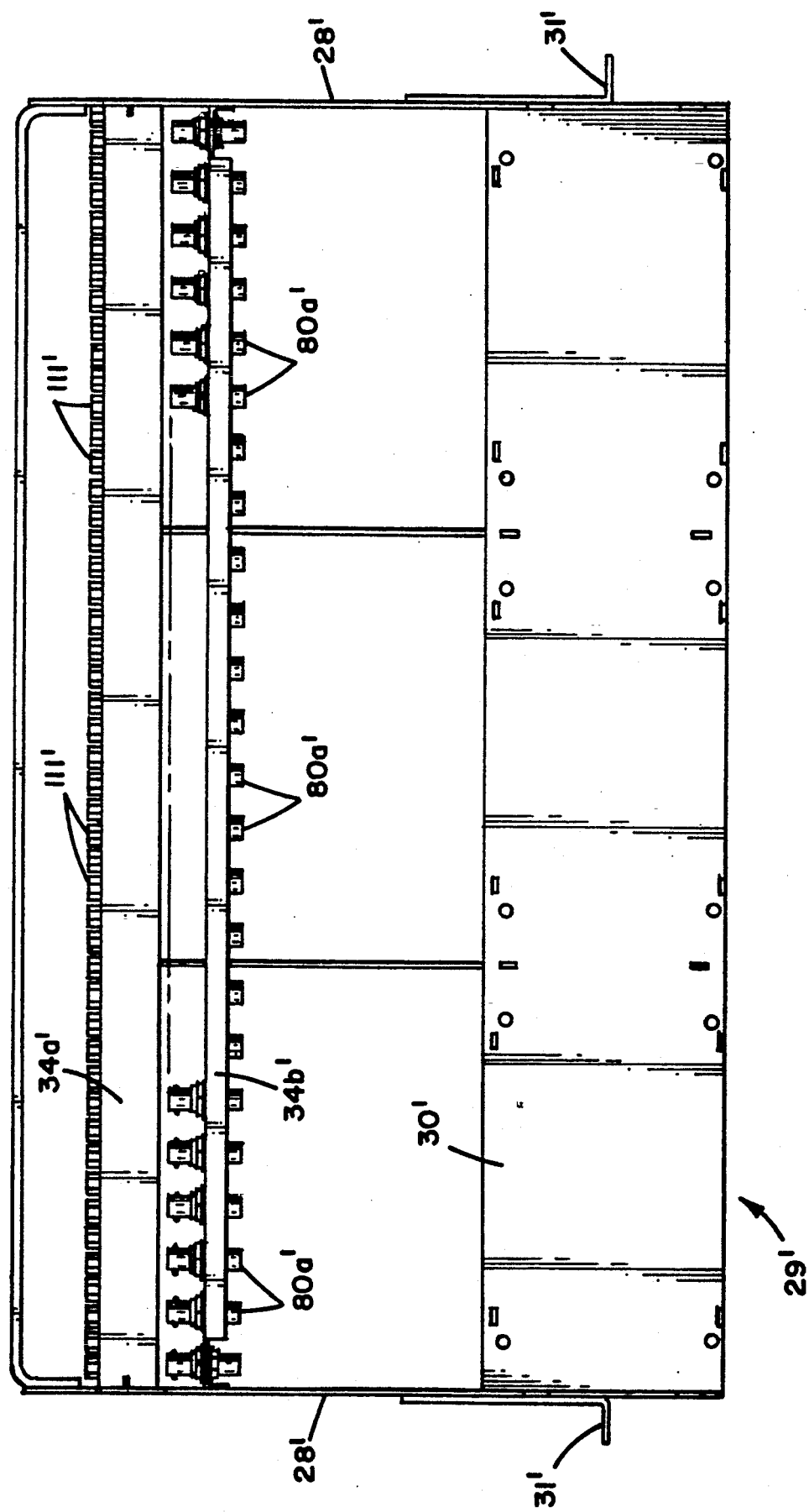
FIG. 15 is a top plan view of the housing of FIG. 14 shown without installed modules.
Figure 16:
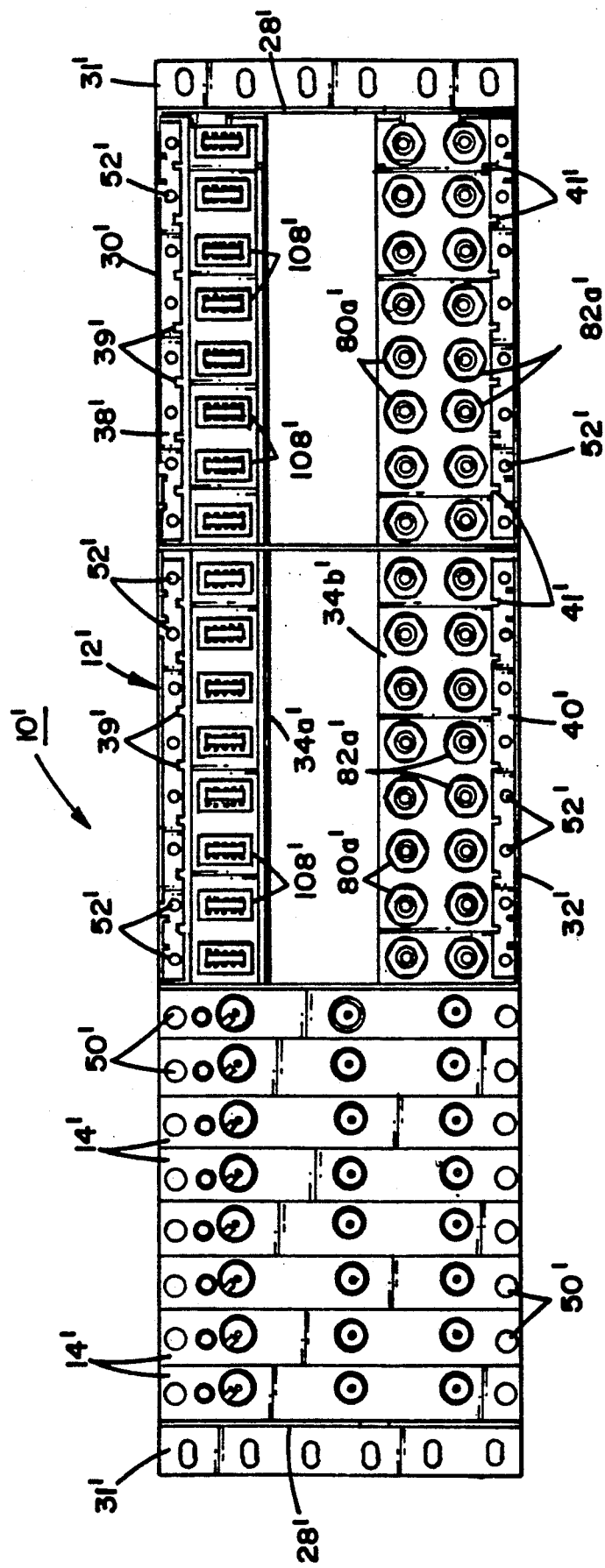
FIG. 16 is a front elevation view of the assembly of FIG. 14 with modules shown installed on the left side (when viewed in FIG. 16) of the housing

Shown best in FIGS. 8 and 10, module 14 is sized to be received within housing 12. As shown in the figures, chassis or housing 12 has a plurality of walls, including side walls 28 and top and bottom walls 30 and 32, respectively. Mounting brackets 31 are provided on side walls 28 to mount housing 12 to a main frame (not shown).

A rear wall 34 cooperates with walls 28, 30 and 32 to define a housing interior 36. The forward facing end 29 of housing 12 is open to permit direct access through the forward surface to the interior 36.

Top and bottom guide strips 38, 40 are provided connected to top and bottom walls 30, 32, respectively. Each of guide strips 38, 40, is provided with a plurality of slots 39, 41, respectively, extending from the forward end 29 of housing 12 toward rear wall 34. Slots 39 are in vertical planar alignment with slots 41.

Shown best in FIG. 1, top and bottom plates 20, 22 of frame 16 are provided with rails 42, 44. Rails 42 are selected to be received within slots 39. Likewise, rails 44 are received within slots 41. With the rails 42, 44 so received within the slots 39, 41, the frame 16 may be slid into and out of housing interior 36.

With reference to FIG. 1, 2 and 10, front cover plate 26 includes top and bottom flanges 46, 48 which carry releasable lock pins 50. The flanges 46, 48 are sized for the pins 50 to oppose aligned holes 52 in forward facing surfaces of guide strips 38, 40. The pins 50 releasably lock the module 14 in an inserted position within housing interior 36.

As shown in FIG. 10, a plurality of modules 14 are shown in the inserted position. So inserted, each of the modules 14 are aligned in side-by-side relation. Also, each module is independently slidable within housing 12 relative to the adjacent modules 14.

2. Circuitry

A plurality of jacks are carried on front cover plate 26 (see FIG. 1). The plurality of jacks include a monitor jack 54, a signal-out jack 56, a signal-in jack 58, a cross-connect-out jack 60 and a cross-connect-in jack 62. Jacks 54, 56, 58, 60 and 62 are connected directly to front cover plate 26.

A plurality of bores, or ports, 64, 66, 68, 70 and 72 (see FIG. 2) are formed completely through front cover plate 26 to permit a plug (not shown) to be inserted within any of jacks 54, 56, 58, 60 and 62, respectively. As is conventional, plug retaining clips 74, 76 are provided mounted on front cover plate 26 for retaining a plug inserted into jacks 60, 62, respectively.

Module 14 also includes a plurality of coaxial connectors (see FIG. 1). The connectors include an equipment-out connector 80 and an equipment-in connector 82. As will be more fully described, each of connectors 80 and 82 is one-half of a pair of mating connectors. Connectors 80, 82 are mounted on rear wall 24.

Carried on frame 16 is a printed circuit board or card 84. Card 84 is mounted flat onto plate 18 by a plurality of screws 86. A rear edge 83 of card 84 extends past rear wall 24 through rear wall opening 23 and presents a plurality of exposed contact pads 90 which are electrically connected to a circuit path (not shown) carried on the card 84. As will be more fully described, pads 90 provide electrical connection between the circuitry of card 84 and electrical elements carried on housing 12.

Each of jacks 54, 56, 58, 60 and 62 are commercially available. Jacks 56 and 58 are switching jacks such as those shown and described in U.S. Pat. No. 4,749,968. Each of jacks 56, 58 include first and second switch elements 90, 92, respectively, shown only schematically in FIG. 5.

Five coaxial cables 94-98 are provided carried within frame 16. Cable 95 provides a circuit pathway between signal-out jack 56 and equipment-out connector 80. Cable 96 provides a circuit path between first switch 90 and cross-connect-out jack 60. Cable 97 provides a circuit path between signal-in jack 58 and equipment-in connector 82. Cable 98 provides a circuit path between second switch 92 and cross-connect-in jack 62.

Shown best in FIG. 5, in the absence of a plug in either of jacks 56, 58, a first normally closed signal pathway is established between equipment-out connector 80 and cross-connect-out jack 60. Similarly, a normally closed second circuit path is provided between equipment-in connector 82 and cross-connect-in jack 62. Upon insertion of a plug within jack 56, first switch 90 is opened and, accordingly, the first path is opened and signal-out jack 56 is connected to equipment-out connector 80. Similarly, upon insertion of a plug within jack 58, second switch 92 is opened and the second signal path is thereby opened and a direct electrical connection is established between signal-in jack 58 and equipment-in connector 82.

The monitor jack 54 is connected by cable 94 across a resistance 93 to jack 56 to provide electrical connection with the first path as shown in FIG. 5. As is known, the insertion of a plug into the monitor jack 54 does not interrupt a signal and permits monitoring of a signal carried along cable 95. It will be appreciated that, although monitor jack 54 is shown monitoring line 95, any other of the cables could be monitored. Indeed, as will be more fully described in the alternative embodiment herein, monitor 54 may be switched to monitor any one of a plurality of circuit pathways.

Figure 9:
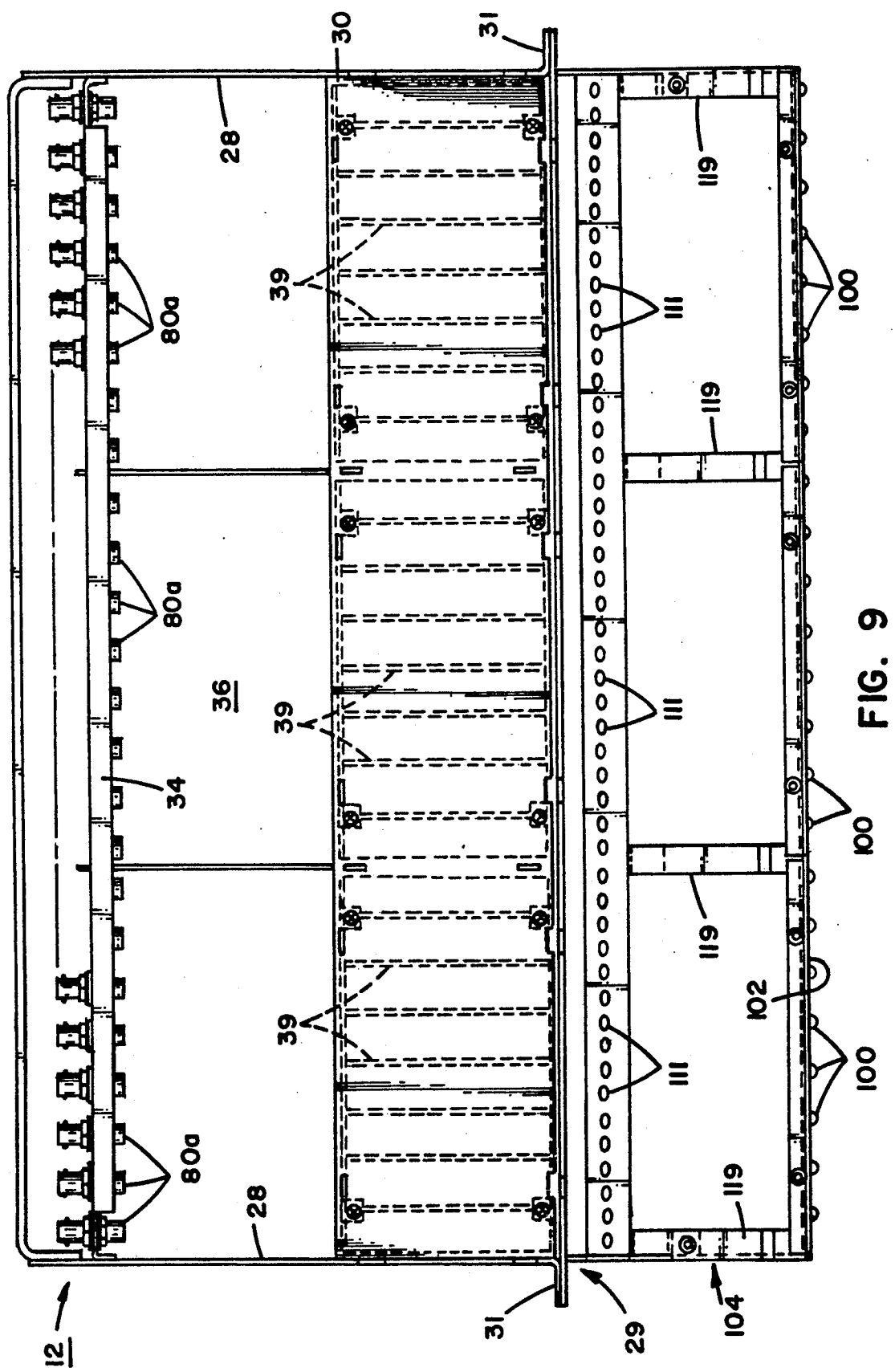
FIG. 9 is a top plan view of the housing of the assembly of FIG. 8 without installed modules.

As is known, a cross-connect system generally includes a tracer lamp indicating cross-connection between any particular DSX circuit and other DSX circuits in a cross-connect bay. In the embodiment shown in FIGS. 8-10, the tracer lamp 100 is shown mounted on a forward panel 102 of a cable tray assembly 104. The assembly 104 is mounted directly below housing 12 on the main frame or bay (not shown).

Tray assembly 104 includes a component housing portion 107 and a light housing portion 109. Shown in phantom in FIG. 8, the component housing portion 107 includes pin jack connections 111 for receiving a pin jack plug 113 (shown phantom). It is known in the industry to have pin jack plugs 113 connected to cross-connect cables (not shown) so that the pin jack plug 113 is inserted within a pin jack 111 associated with the DSX module that is being cross-connected with another DSX module.

Lamp component compartment 109 includes a plurality of electric lamp connections 115 (shown phantom). Light emitting diode (LED) lamps 100 are inserted into connections 115 through front panel 102. In a preferred embodiment, and as shown in FIG. 10, openings 117 are provided to accept other lamps (not shown) which may be desired to be added from time to time to correspond with circuit enhancement components which may be added in accordance with the invention as will be described.

Front panel 102 includes a designation strip 118 on which an operator makes notes or other indicia as desired. The upper surface of assembly 104 includes a plurality of wire retaining clips 119 for cable management and organizing cross-connect cables and the like To complete the electrical circuitry to the tracer lamp 100 and pin jack 111, a conductor 106 (see FIG. 8) connects the circuitry contained within assembly 104 with a back panel connector 110.

As shown in FIG. 5, the tracer lamp 100 is part of a monitor circuitry. The monitor circuitry includes a monitor switch 112 which is activated by a plug (schematically shown at "LS") inserted within monitor jack 54. Switch 112 is connected by electrical conductor leads 114 to the circuitry of circuit card 84, as shown in FIG. 1.

Figure 4:
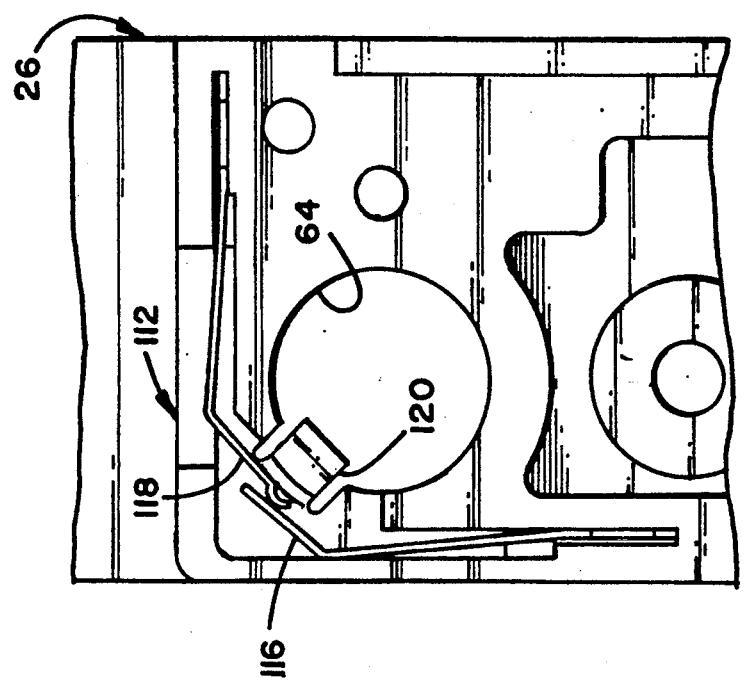
FIG. 4 is a view of the switch components of FIG. 3 shown in a second position.
Figure 3:
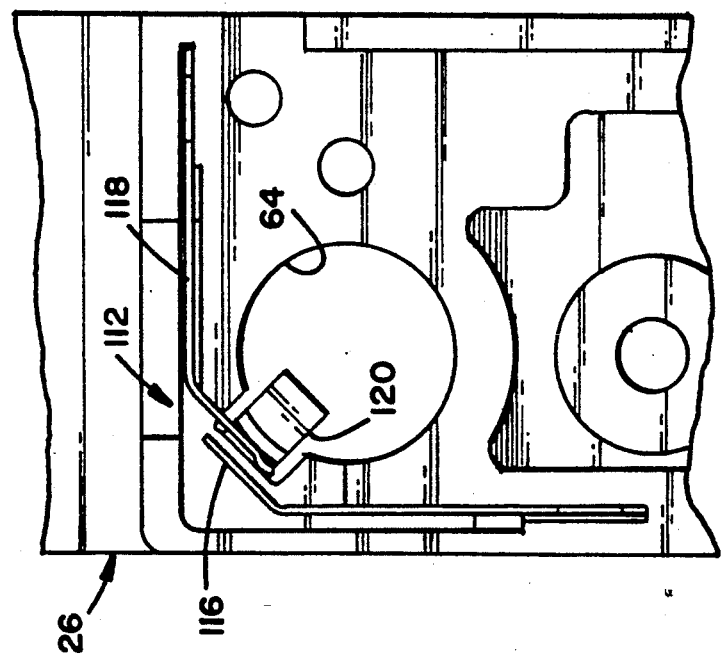
FIG. 3 is an enlarged plan view of monitor switch components according to the present invention shown in a first position.

Switch 112 is shown schematically in FIG. 5. The switch 112 is also shown and may be understood with reference to FIGS. 1-4. FIGS. 3 and 4 show the inner surface of face plate 26 (i.e., the side opposite that shown in FIG. 2).

As shown, switch 112 includes first and second leaf spring switch elements 116, 118. Each of switch elements 116, 118 is mounted on front cover plate 26 adjacent monitor bore 64.

The switch elements 116, 118 are spring electrical contacts which are movable between a first position (shown in FIG. 3) with no contact between elements 116, 118, and a second position (shown in FIG. 4) with switch elements 116, 118 in electrical contact. To urge second switch element 118 against its spring bias into the contact of the second position, a cam 120 is provided.

As shown, cam 120 is integrally formed with cover plate 26 and extends partially into bore 64 when no plug is inserted within bore 64. Cam 120 is resilient and may be urged by a plug against second switch element 118 to urge it into contact with first switch element 116. Upon removal of a plug from bore 64, the resiliency of cam 120 and the spring bias of switch element 118 urges cam 120 back into bore 64 with switch element 118 moving away from switch element 116.

3. Sliding Connections

As previously mentioned, out-connector 80 and in-connector 82 are half of a pair of connectors. Each of connectors 80, 82 are identical and a description of connector 80 will suffice as a description of connector 82.

Shown best in FIGS. 17 and 18, connector 80 is a male half of a male-female connector assembly. Male half 80 is mounted to rear wall 24 by a nut 25 received on external threads 27. The female half 80a is similarly mounted on rear wall 34 of housing 12 by a nut 25a received on threads 27a.

Connector halves 80 and 80a include axially disposed conductor pins 83 and 83a. Shown best in FIG. 17, pin 83 is sized to be slidably received within an opening 85a on pin 83a to effect electrical contact between pins 83 and 83a.

Each of pins 83, 83a are held centrally disposed within connector halves 80, 80a by insulators 87, 87a. Connector half 80 has a concentric, cylindrical conducting shield 91 and an outer shell 89 which define an annular space 93. Conductor half 80a has cylindrical shield 89a sized to be received within space 93 and electrically engage shield 91 and outer shell 89.

With halves 80 and 80a axially aligned, the halves 80, 80a may be joined as shown in FIG. 18 to effect electrical connection. Outer shield 91 has a conductor side 99 which is conventional and may be hardwired to a coaxial cable. Connector half 80a has a standard BNC connector 81 which includes a central conductor 81a such that BNC connector 81 can be releasably attached to a coaxial cable in a conventional manner.

Connector half 80 slidably mates with connector half 80a. The slidable coaxial connection of connector 80 and 80a occurs when connector 80 is in coaxial alignment with connector 80a. This alignment occurs when module 14 is inserted within housing 12 with rails 42, 44 received within slots 39, 41. Connector halves 80, 80a are in electrical connection when the module 14 is in the inserted position shown in FIG. 8.

Referring now to FIGS. 8 and 10, housing 12 also carries an internal connector 108 which is disposed to slidably receive and make electrical contact with pads 90 when the module 14 is disposed in housing 12. Connectors such as connector 108 for making electrical connection with an edge of a printed circuit board are well known. Connector 108 is electrically connected to contacts 109 on wall 34 for electrical connection to a power source (not shown).

B. Second Embodiment

The embodiment shown in FIGS. 1, 5 and 8-10 is a front cross-connect embodiment where cross-connect jacks 60, 62 are on the forward side of the assembly. From time to time, and to accommodate specific customer needs, it may be desirable to provide cross-connection on the rear side of the assembly.

FIGS. 11-16 show an alternative embodiment of the present invention incorporating rear cross-connection. Like the embodiment of FIGS. 1-5 and 8-10, the rear cross-connect embodiment includes a frame 16', a module 14') and housing 12' having elements similar to that of frame 16 and housing 12 and being numbered identically, except with the addition of a prime (').

Structurally, module 14' differs from that of module 14 in that cross-connect jacks 60, 62 are not provided on the front cover plate 26'. Instead, a cross-connect-out connector 60' and a cross-connect-in connector 62' are provided on an extending rear wall portion 24a'. Each of connectors 60' and 62' are BNC type connectors suitable for releasable connection to coaxial cables as is known in the art.

The embodiment of FIGS. 11-16 also differs from that of FIGS. 1, 5 and 8-10 in that the tracer lamp 100' is carried directly on the front cover plate 26'. The leads 114' includes a means for providing a power source to the tracer lamp 100'.

FIG. 14 shows module 14' inserted within a modified housing 12'. The housing 12' does not include a tray assembly 104. Also, rear wall 34' is divided into upper portion 34a' and lower portion 34b' which are spaced apart to permit wall 24a' and connectors 60' and 62' to extend beyond wall 34b' and be exposed to an operator on the rear side of housing 12'. A connector 108' is carried within housing 12' and disposed to slidably receive and electrically connect with pads 90'.

A pin jack 111' is carried on the rear side of housing 12'. Also, a connector 109' is carried on the rear side of housing 12' to connect to a power source. The pin jack 111' receives a pin plug (not shown) carried by cross-connect cables connected to either of connectors 60' or 62'.

C. Monitor Switching and Circuit Enhancement

As previously noted, the present invention provides for the possibility of switching the monitoring function to monitor any one of a plurality of circuit paths within the module. Also, the present invention provides for the possibility of enhanced circuitry in the connector module. These features are shown in the embodiment of FIGS. 6 and 7.

In the following text, the switching structure will be shown in an embodiment including a coaxial cable DSX. It will be appreciated by those skilled in the art that the invention of the switching apparatus need not be limited to such coax DSX. Instead, switching can also be applied to non-coax DSX connectors such as that shown and described in U.S. Pat. No. 4,840,568.

The embodiment of FIG. 6 is a module 14" for forward cross-connection. It will be appreciated that the features of monitor switching and circuit enhancement could also be applied to rear cross-connect modules.

To the extent module 14" includes elements identical to that in module 14, identical numbering sequence will be carried throughout with the addition of double prime (") to distinguish from module 14.

In module 14", the circuit card 84 of module 14 is replaced with an enlarged circuit board 84" connected by screws 86" to frame 16". An operator-engageable rotary switch 122 having a plurality positions is shown with four positions (labeled as EO, EI, XO and XI for equipment-out, equipment-in, cross-connect-out, and cross-connect-in, respectively, in FIG. 7) provided on front cover plate 26". A conductor 124 connects switch 122 with a connector 126 connected to circuit board 84".

Coaxial cables 94, 96 and 98 of the embodiment of FIG. 1 are replaced in module 14" with cables 94a, 94b, 94c, 96a, 96b, 98a and 98b. Cables 94a, 94b, 96a and 96b terminate at connector 128 for connecting the cables to circuitry of the circuit board 84". Similarly, cables 94c, 98a and 98b are connected to circuit board 84 by connector 130. It will be appreciated that connectors such as connector 128, 130 for receiving coaxial cables and connecting then to circuit boards are well known in the art and form no part of this invention per se and a greater or lesser number of connectors could be utilized even though two are shown.

The circuit board carries switch circuitry schematically shown at 132. The switch circuitry 132 switches the connection between monitor cable 94a and various circuit paths of the cross-connect circuitry on board 84" to permit selective monitoring of any one of the paths.

Figure 19:
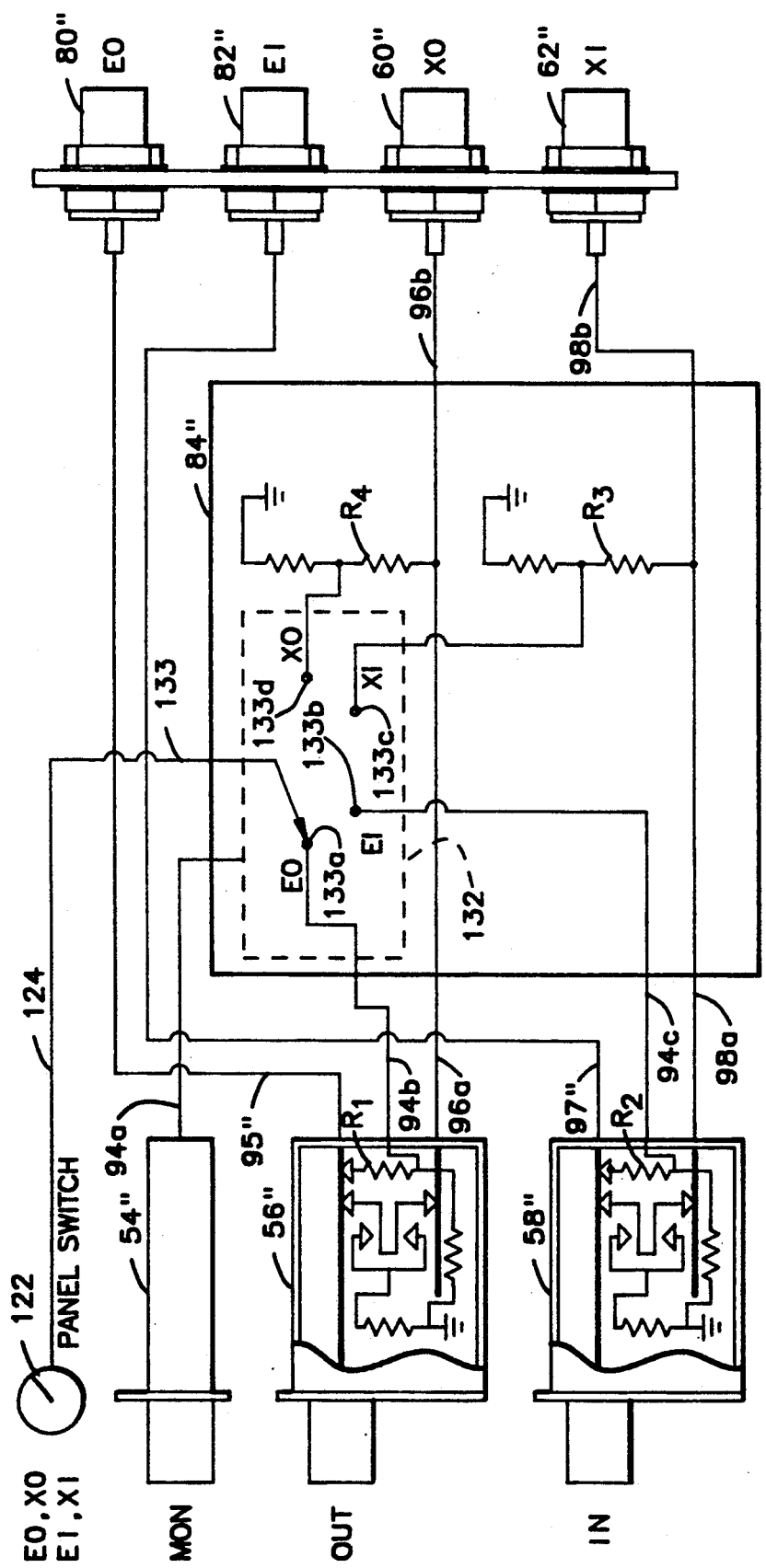
FIG. 19 is a schematic representation of the DSX module of FIG. 6.

FIG. 19 is a more descriptive schematic representation of the circuitry 132. The circuitry 132 includes an electronic switch 133 which, upon actuation of the manual switch 122, creates electrical contact between the monitor jack 54" and contact points 133a through 133d. Contact point 133a is in communication across resistor $R_1$ to the equipment-out connector 80" to permit monitoring of the signal at the equipment-out connector. Switching to point 133b connects monitor 54" across resistor $R_2$ to the equipment-in connector 82". Switching to point 133c connects across resistor $R_3$ to the cross-connect-in connector 62". Finally, switching to point 133d connects monitor 54" across resistor $R_4$ to the cross-connect-out connector 60". In the embodiment shown in FIG. 19, the cross-connect connectors are shown connected on the rear panel to illustrate that cross-connection can occur either to connectors on the rear panel or to jacks on the front panel.

Figure 20:
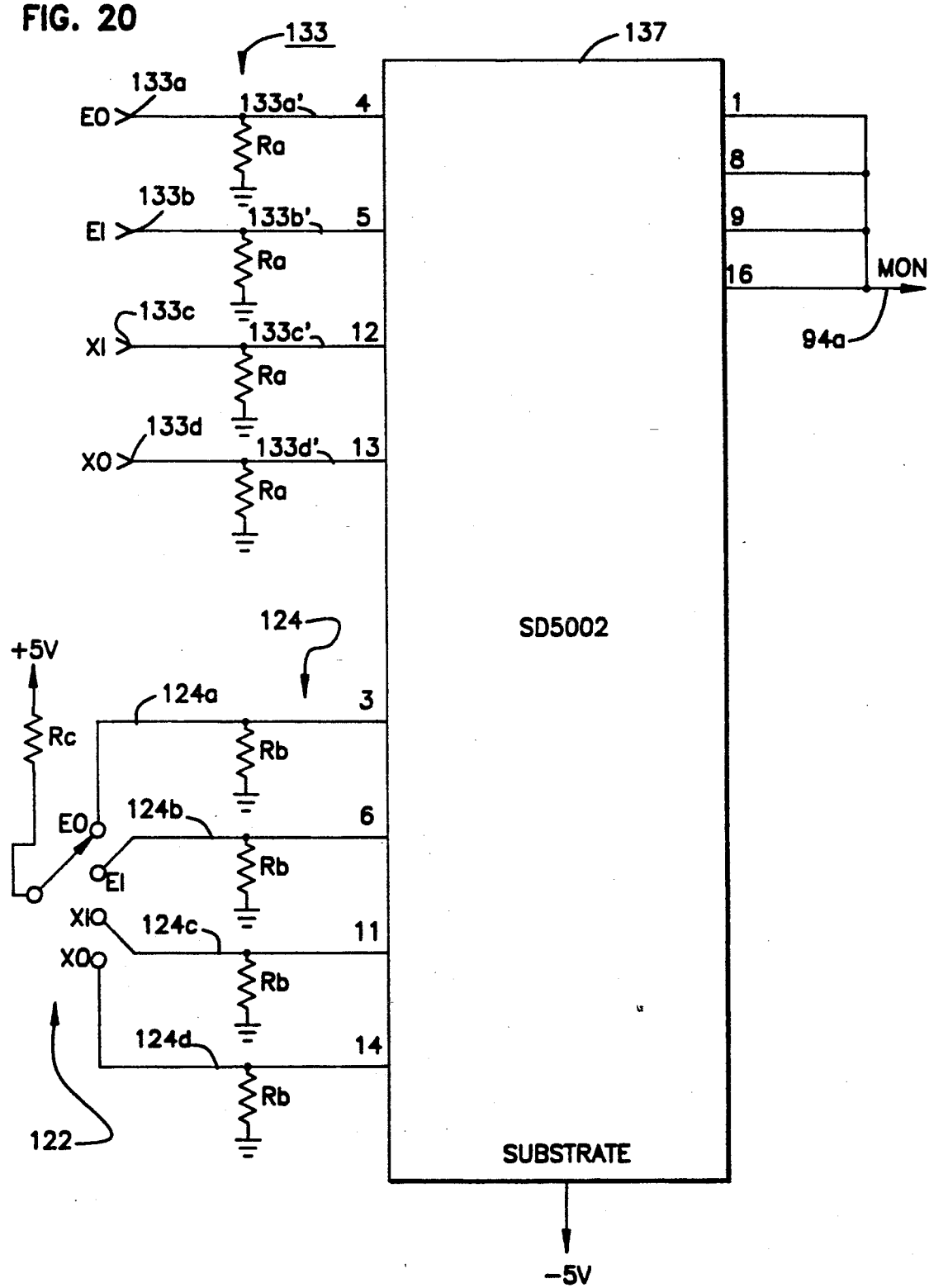
FIG. 20 shows the switching circuitry of the module of FIG. 19.

FIG. 20 shows the switch circuitry 133. In FIG. 20, a commercially available integrated chip circuit 137 is shown. Chip 137 is a switching chip and is preferably the SD5002 available through the Siliconix Company, Santa Clara, Calif., U.S.A. and other vendors.

In FIG. 20, the numbers adjacent the chip indicate the pin numbers on the SD5002. The circuit paths from connection points 133a through 133d are shown as 133a' through 133d'. As is conventional, each of circuit paths 133a' through 133d' are connected across an equivalent value resistor, $R_a$, to ground. The conductors are connected to pin contact points 4, 5, 12 and 13, respectively.

As also shown in FIG. 20, the conductor 124 from switch 122 includes four conductor elements 124a through 124d corresponding with preset marked points EO, EI, XI, XO on front panel 26. Conductors 122a through 122d are connected across equivalent value resistors $R_b$, to ground Also, the switch element 122 is connected across a resistance $R_c$, to a plus five volt potential. Conductors 124a through 124d are connected to pin locations 3, 6, 11 and 14, respectively, on the SD5002. A monitor conductor is connected to each of pin locations 1, 8, 9 and 16. The substrate of the chip is connected to a minus five volt potential. It will be appreciated by those skilled in the art that the arrangement of a switch circuitry such as that shown in FIG. 20 using an SD5002 is known in the art.

Also shown schematically on circuit board 84" (FIG. 6) is enhancement circuitry 134 which may be added at an option of the user, and which would enhance the signal carried through module 14". A common type of enhancement circuitry is a repeater circuit. It will be appreciated by those skilled in the art that enhancement circuitry such as repeater circuitry 134 is well known in the art. The use of enhancement circuitry on a modular DSX board is shown in the aforementioned U.S. Pat. No. 4,840,568.

From the foregoing detailed description of the present invention, it has been shown how the objects of the invention have been attained in a preferred manner. The present invention provides for a coax DSX which is completely modularized and may be connected to a prewired frame through split connections. While the foregoing description sets forth preferred and alternative embodiments, it is the intent of the present invention that modifications and equivalents of the disclosed concepts, such as those which readily occur to one skilled in the art, would be included within the scope of the present invention.

What is claimed is:

1. A modulator digital signal cross-connect assembly for electrical signals carried by coaxial cables, said assembly comprising:

(a) a chassis having wall means defining a chassis exterior and having a least a partially opened front surface;

(b) a plurality of coaxial connectors each having a first one of a pair of mating halves fixed to said chassis, each of said first ones slidably and releasably connectible and disconnectible to a second one of said pair of mating halves upon relative movement of said first one and said second one toward and away, respectively, from each other along a predetermined linear axis of alignment, each of said first ones of said pair of mating halves having means for electrical connection to a coaxial cable;

(c) a plurality of digital signal cross-connect modules each having:

(i) a frame having a forward face, said frame sized to be slidably received within said chassis interior when said frame is inserted in a predetermined direction of travel toward an inserted position, said forward face exposed to an operator facing said front surface when said frame is in said inserted position;

(ii) a plurality of jacks carried by said frame and including at least a signal-in jack and a signal-out jack, each of said jacks disposed to releasably receive a plug inserted into said module at said forward face;

(iii) a plurality of electrical connector means carried on said frame and including at least an equipment-out connector and an equipment-in connector;

(iv) electrical cross-connect circuit means including a cross-connect-out connector and a cross-connect-in connector, and further including a plurality of coaxial cables connecting said plurality of jacks with said plurality of electrical connector means, said cross-connect circuit means including:

(A) said equipment-in connector connected through a first circuited path to said cross-connect-in connector;

(B) said equipment-out connector connected through a second circuit path to said cross-connect-out connector;

(C) said signal-in jack connected to said equipment-in connection;

(D) said signal-out jack connected to said equipment-out connector;

(E) first switch means activated by connection of a plug to said signal-in jack for opening said first circuit path;

(F) second switch means activated by connection of a plug to said signal-out jack for opening said second circuit path;

(d) at least said equipment-in connectors and said equipment-out connectors each comprising a second one of said pair of mating halves, each of said second ones disposed on said module frame for movement therewith to oppose and slidably mate with one of said first ones of said pair of mating means fixed to said chassis when said frame is inserted in said direction of travel to said inserted position;

2. An assembly according to claim 1 wherein said cross-connect-in connector and said cross-connect-out connector are mounted on said frame to be exposed through the rear of said chassis.

3. An assembly according to claim 1 wherein said cross-connect-in connector and said cross-connect-out connector are each one of said plurality of jacks.

4. An assembly according to claim 1 wherein said plurality of jacks includes a monitor jack;

said cross-connect circuit means including means electrically connected to said monitor jack for said monitor jack to be electrically connected to a predetermined signal path of said cross-connect circuit means.

5. An assembly according to claim 4 wherein said module includes monitor circuit means including indicator means exposed to an operator for identifying a cross-connection.

6. An assembly according to claim 5 comprising switch means for activating said indicator means.

7. An assembly according to claim 6 wherein said switch means includes first and second contact elements disposed adjacent said monitor jack, said second element movable between first and second positions upon insertion of a plug into said monitor jack, said second element in said first position disposed electrically disengaged from said first element, said second element in said second position disposed electrically engaged with said first element.

8. An assembly according to claim 7 wherein said forward face has bore defining surfaces for defining a bore sized to receive a plug to be inserted into said monitor jack, said bore defining surfaces including a resilient cam for urging said second element to said second position upon insertion of a plug into said bore.

9. An assembly according to claim 5 wherein said monitor circuit means includes a first connector element carried on said frame, said housing including a second connector element carried on said housing, said first and second connector elements disposed to be releasably connected in electrical engagement when said module is in said inserted position.

10. An assembly according to claim 4 wherein said cross-connect circuit means includes a monitor switch means having an operator engageable switch for selecting said predetermined signal path to be any one of a plurality of signal paths of said cross-connect circuit.

11. An assembly according to claim 1 wherein said cross-connect circuit means includes a coax circuit board carried by said frame and further includes a coax circuit board connector for connecting coaxial cables from said plurality of jacks and electrical connector means to said circuit board.

12. An assembly according to claim 11 wherein said circuit board carries signal enhancement circuitry.

13. An assembly according to claim 12 wherein said signal enhancement circuitry includes a repeater circuit.

14. An assembly according to claim 5 wherein at least a portion of said cross-connect circuit means and said monitor circuit means are carried on a circuit board mounted on said frame.

15. An assembly according to claim 14 wherein said circuit board carries signal enhancement circuitry.

16. An assembly according to claim 15 wherein said enhancement circuitry is a repeater circuit.

17. An assembly according to claim 14 wherein said circuit board includes exposed electrical contacts, said housing including a board connector disposed to electrically engage said contacts when said module is in said inserted position.

18. An assembly according to claim 1 wherein said mating means includes a female and male coax connector, said male and female connectors having mating elements selected to electrically engage said connectors upon sliding axially aligned engagement of said connectors.

19. An assembly according to claim 1 wherein said frame and said housing include cooperating rails and slots for said frame to be slidably received within said housing and directed in said direction of travel.

20. A digital signal cross connect assembly comprising:

a plug receiving forward face;

a plurality of jacks including at least a signal-in jack and a signal-out jack, each of said jacks disposed to releasably receive a plug inserted into said forward face;

a plurality of electrical connector means including at least a cross-connect-out connector, a cross-connect-in connector, an equipment-out connector and an equipment-in connector;

electrical cross-connect circuit means for providing a plurality of signals paths between said jacks and said connectors, said circuit means including:

(a) said equipment-in connector connected through a first circuit path to said cross-connect-in connector;

(b) said equipment-out connector connected through a second circuit path to said cross-connect-out connector;

(c) said signal-in jack connected to said equipment-in connector along a third signal path;

(d) said signal-out jack connected to said equipment-out connector along a fourth signal path;

(e) first switch means activated by connection of a plug to said signal-in jack for opening said first circuit path;

(f) second switch means activated by connection of a plug to said signal-out jack for opening said second circuit path;

a single monitor jack for releasably receiving a single monitor plug;

said electrical cross-connect circuit means including a selectively activated monitor switch means connected to said monitor jack for said monitor jack to be electrically connected to monitor a signal along any selected one of said first, second, third or fourth signal paths and, at an option of an operator, be switched to monitor a signal along any different one of said paths.

21. An assembly according to claim 20 comprising an operator engageable switch handle means movable between any one of a plurality of positions, said switch handle means connected to said monitor switch means to activate said monitor switch means.

22. An digital signal cross-connect assembly according to claim 20 wherein said cross-connect-in connector and said cross-connect-out connector are jacks accessible through said forward face.

23. A digital signal cross-connect assembly according to claim 20 wherein said cross-connect-in connector and said cross-connect-out connector are accessible on a side of said assembly opposite said forward face.

* * * * *

UNITED STATES PATENT AND TRADEMARK OFFICE
CERTIFICATE OF CORRECTION

PATENT NO. : 5,214,673

DATED : May 25, 1993

INVENTOR(S) : Morgenstern et al.

It is certified that error appears in the above-identified patent and that said Letters Patent is hereby corrected as shown below:

Title page, item [57]:
In the Abstract, line 15, "path" should read --paths--.

Col. 2, line 48, insert --a-- after the word "is".

Col. 3, line 51, "Fig." should read --Figs.--.

Col. 5, line 29, insert --.-- after the word "like".

Col. 6, line 35, "connector" should read --connectors--.

Col. 6, line 63, delete ")" after the numeral "14'".

Col. 7, line 53, insert --of-- after the word "plurality".

Col. 7, line 67, "connector" should read --connectors--.

Col. 8, line 45, insert --.-- after the word "ground".

UNITED STATES PATENT AND TRADEMARK OFFICE
CERTIFICATE OF CORRECTION

PATENT NO. : 5,214,673
DATED : May 25, 1993
INVENTOR(S) : Morgenstern et al.

It is certified that error appears in the above-identified patent and that said Letters Patent is hereby corrected as shown below:

Col. 9, line 10, "modulator" should read --modular--.

Col. 11, line 25, "cross connect" should read --cross-connect--.

Col. 12, line 32, "An" should read --A--.

Signed and Sealed this

Twenty-second Day of February, 1994

Attest:

BRUCE LEHMAN

*Attesting Officer*  *Commissioner of Patents and Trademarks*